US011412173B2

(12) United States Patent
Yamamoto et al.

(10) Patent No.: US 11,412,173 B2
(45) Date of Patent: Aug. 9, 2022

(54) IMAGE PROCESSING DEVICE AND IMAGE PROCESSING METHOD

(71) Applicant: SONY CORPORATION, Tokyo (JP)

(72) Inventors: Daisuke Yamamoto, Tokyo (JP); Takahiro Katagiri, Tokyo (JP)

(73) Assignee: SONY CORPORATION, Tokyo (JP)

( * ) Notice: Subject to any disclaimer, the term of this patent is extended or adjusted under 35 U.S.C. 154(b) by 377 days.

(21) Appl. No.: 16/332,661

(22) PCT Filed: Nov. 2, 2017

(86) PCT No.: PCT/JP2017/039695
§ 371 (c)(1),
(2) Date: Mar. 12, 2019

(87) PCT Pub. No.: WO2018/092596
PCT Pub. Date: May 24, 2018

(65) Prior Publication Data
US 2021/0289163 A1    Sep. 16, 2021

(30) Foreign Application Priority Data

Nov. 17, 2016 (JP) ............................. JP2016-224019

(51) Int. Cl.
*H04N 5/77* (2006.01)
*H04N 5/783* (2006.01)
(Continued)

(52) U.S. Cl.
CPC ............. *H04N 5/783* (2013.01); *G09G 5/005* (2013.01); *H04N 5/775* (2013.01);
(Continued)

(58) Field of Classification Search
None
See application file for complete search history.

(56) References Cited

U.S. PATENT DOCUMENTS

2004/0136686 A1* 7/2004 Kono ..................... H04N 7/012
386/232
2006/0072910 A1   4/2006 Kato
(Continued)

FOREIGN PATENT DOCUMENTS

CN          1499836 A      5/2004
JP       2001-117539 A     4/2001
(Continued)

OTHER PUBLICATIONS

International Search Report and Written Opinion of PCT Application No. PCT/JP2017/039695, dated Jan. 30, 2018, 10 pages of ISRWO.
(Continued)

*Primary Examiner* — Eileen M Adams
(74) *Attorney, Agent, or Firm* — Chip Law Group

(57) ABSTRACT

The present technology relates to an image processing device, an image processing method, and a program, which make it possible to perform continuous-shooting photography at a desired speed. A control section performs control for switching over a drive frequency of a display panel in response to a photographing cycle of an image. The present technology can be applied to, for example, an electronic device that includes a continuous-shooting photography function, such as a digital still camera, a digital video camera, and a smart phone.

14 Claims, 8 Drawing Sheets

(51) Int. Cl.
*G09G 5/00* (2006.01)
*H04N 5/775* (2006.01)
*H04N 9/79* (2006.01)

(52) U.S. Cl.
CPC ... *H04N 9/7925* (2013.01); *G09G 2320/0261* (2013.01); *G09G 2340/0435* (2013.01)

(56) References Cited

U.S. PATENT DOCUMENTS

| | | | | |
|---|---|---|---|---|
| 2007/0247544 | A1* | 10/2007 | Imamura | H04N 5/2352 348/366 |
| 2009/0122207 | A1* | 5/2009 | Inoue | G09G 3/2081 348/739 |
| 2010/0149377 | A1* | 6/2010 | Shintani | H04N 5/23245 348/231.5 |
| 2017/0053592 | A1* | 2/2017 | Shin | A61B 5/742 |

FOREIGN PATENT DOCUMENTS

| | | |
|---|---|---|
| JP | 2004-159191 A | 6/2004 |
| JP | 2005-176246 A | 6/2005 |
| JP | 2006-109113 A | 4/2006 |
| JP | 2007-316599 A | 12/2007 |
| JP | 2010-087708 A | 4/2010 |
| JP | 2017-040908 A | 2/2017 |

OTHER PUBLICATIONS

Office Action for JP Patent Application No. 2018-551566, dated Dec. 21, 2021, 04 pages of English Translation and 04 pages of Office Action.

Office Action for EP Patent Application No. 17870929.1, dated Dec. 16, 2021, 09 pages of Office Action.

* cited by examiner

FIG. 9

| CONTINUOUS-SHOOTING SPEED | DRIVE FREQUENCY |
|---|---|
| 20fps | 60Hz (NTSC) |
| 25fps | 50Hz (PAL) |
| 27fps | 54Hz |
| 30fps | 60Hz (NTSC) |

IMAGE PROCESSING DEVICE AND IMAGE PROCESSING METHOD

CROSS REFERENCE TO RELATED APPLICATIONS

This application is a U.S. National Phase of International Patent Application No. PCT/JP2017/039695 filed on Nov. 2, 2017, which claims priority benefit of Japanese Patent Application No. JP 2016-224019 filed in the Japan Patent Office on Nov. 17, 2016. Each of the above-referenced applications is hereby incorporated herein by reference in its entirety.

TECHNICAL FIELD

The present technology relates to an image processing device, an image processing method, and a program, and, in particular, relates to an image processing device, an image processing method, and a program, which have made it possible to perform continuous-shooting photography at a desired speed regardless of a display drive system.

BACKGROUND ART

Digital still cameras (hereafter, also referred simply to camera) can photograph not only a still image but also a moving image. In display drive systems of a moving image, for example, there are a NTSC system and a PAL system, and in the digital still camera, a function that sets a display drive system is mounted (for example, refer to Patent Documents 1 and 2). The digital still camera changes a drive frequency of a liquid crystal panel and a finder and a frame rate of a moving image to be created (recorded) in accordance with the set display drive system. Moreover, in the case of causing a moving image photographed with a camera to be output and displayed on an external display device such as a television receiver, it is necessary to perform photographing after having matched the display drive system of the camera with the display drive system of an external display device beforehand.

On the other hand, in recent years, in the digital still cameras, a continuous-shooting function that continuously photographs a plurality of sheets of still images at a high speed, has been improved dramatically, and, for example, there exists also a camera that can perform continuous-shooting at 20 fps (frame per second).

CITATION LIST

Patent Literature

Patent Document 1: JP H11-215441A
Patent Document 2: JP 2004-336608A

DISCLOSURE OF INVENTION

Technical Problem

However, since the drive at the time of the continuous-shooting photography is also dependent on the display drive system of a moving image, a continuous-shooting speed may lower due to the display drive system.

For example, it is assumed that a continuous-shooting speed of a camera is set to 20 fps in which one sheet of a still image is photographed per $1/20$ seconds. In the case where the display drive system is the NTSC system, one frame is renewed in $1/60$ seconds. Accordingly, in order to perform the continuous-shooting photography at 20 fps, it is sufficient if one sheet of a still image is photographed for every three frame times. Since the timing of continuous-shooting becomes an integral multiple of a display cycle, the camera can perform the continuous-shooting photography at 20 fps.

On the other hand, in the case where the display drive system is the PAL system, one frame is renewed in $1/50$ seconds. Accordingly, in order to perform the continuous-shooting photography at 20 fps, it is necessary to photograph one sheet of a still image for every 2.5 frame times. However, since the timing of continuous-shooting needs to synchronize with the timing of display drive, the continuous-shooting speed is made to photograph one sheet of a still image for every 3 frame times. As a result, the continuous-shooting speed lowers to 16.6 fps.

The present technology has been achieved in view of such a situation, and is one that makes it possible to perform the continuous-shooting photography at a desired speed regardless of a display drive system.

Solution to Problem

An image processing device according to an aspect of the present technology is an image processing device, including: a control section that performs control for switching over a drive frequency of a display panel in response to a photographing cycle of an image.

An image processing method according to an aspect of the present technology is an image processing method, including: a step of performing, by an image processing device, control for switching over a drive frequency of a display panel in response to a photographing cycle of an image.

A program according to an aspect of the present technology is a program for causing a computer to function as: a control section that performs control for switching over a drive frequency of a display panel in response to a photographing cycle of an image.

In one aspect of the present technology, the drive frequency of a display panel is switched over in response to the photographing cycle of an image.

In this connection, a program can be provided by transmitting through a transmission media or by recording in a recording medium.

The recording device may be an independent device, or may be an internal block constituting one device.

Advantageous Effects of Invention

According to one aspect of the present technology, it is possible to perform the continuous-shooting photography at a desired speed regardless of a display drive system.

Note that the advantageous effects described herein are not necessarily limiting and advantageous effects described in the present disclosure may also be obtained.

BRIEF DESCRIPTION OF DRAWINGS

FIG. 9 is a diagram showing a correspondence table between a continuous-shooting speed and a drive frequency.

MODE(S) FOR CARRYING OUT THE INVENTION

Figure 1:
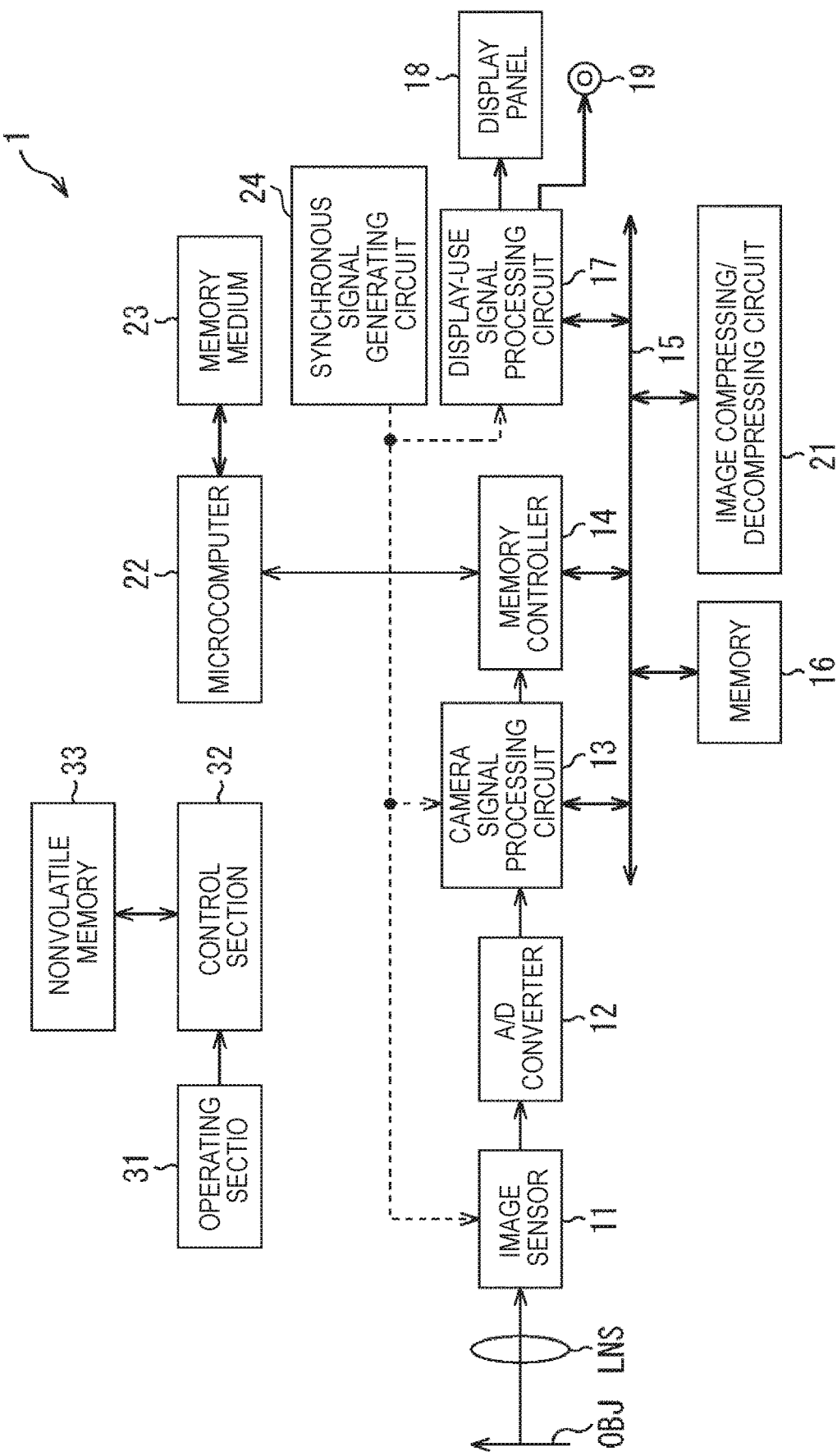
FIG. 1 is a block diagram showing a constitution example of one embodiment of a camera to which the present technology has been applied.

Hereinafter, a mode for executing the present technology (hereinafter, referred to as an embodiment) will be described. It should be noted that the description is given in the following order.

1. Block diagram of camera
2. Correspondence relationship between each screen and display drive system
3. Drive control processing flow at time of changing to continuous-shooting photography mode
4. Drive control processing flow at time of changing to reproduction mode
5. Drive control processing flow at time of changing continuous-shooting speed
6. Drive control processing flow at time of connecting external display device
7. Conclusion
8. Modified example
9. Example of computer

1. BLOCK DIAGRAM OF CAMERA

FIG. 1 is a block diagram showing a constitution example of one embodiment of a camera (imaging device) to which the present technology has been applied.

A camera 1 in FIG. 1 is a digital still camera that has two state modes of a photography mode that photographs a still image or a moving image and a reproduction mode that reproduces a photographed content (a still image or a moving image), and that, in the photography mode, further includes two photographing operation modes of a still image mode that photographs a still image and a moving image mode that photographs a moving image. Moreover, the camera 1 also includes a continuous-shooting function, and, in the still image mode, can continuously photograph (continuous-shooting photography) a preset number of sheets (continuous-shooting sheet number) of still images.

In the camera 1, an image of a photographic object OBJ is projected and light-received onto an image sensor 11 through an imaging lens LNS. The image sensor 11 is a photographing section that photographs a photographic object OBJ, and includes, for example, a charge coupled device (CCD) or complementary metal oxide semiconductor (CMOS) image sensor. The image sensor 11 converts an amount of incident light into an electrical signal per a pixel in accordance with a synchronous signal supplied from a camera signal processing circuit 13, and outputs it to an A/D converter 12 as a pixel signal.

The A/D converter 12 converts an analog pixel signal supplied from the image sensor 11 into digital image data, and outputs it to the camera signal processing circuit 13. The camera signal processing circuit 13 applies processing, such as white balance correction and gamma correction, for image data supplied from the A/D converter 12, further converts the image data into image data in a YUV format, and supplies the resulting image data to a memory controller 14.

The memory controller 14 writes the image data supplied from the camera signal processing circuit 13 into a display-use area in the memory 16 through an image bus 15. This display-use area in the memory 16 is one that constitutes a so-called video RAM, and its address and a dot position on a display screen correspond to each other.

The memory controller 14 reads out the image data written in the display-use area in the memory 16, and supplies it to a display-use signal processing circuit 17 through an image bus 15. The display-use signal processing circuit 17 converts the image data into image data in an RGB format, further D/A-converts the image data into analog image signals, supplies them to a display panel 18, and causes them to be displayed as a color image. Moreover, the display-use signal processing circuit 17 can also form color video signals simultaneously with the analog image signals, output them from the external output terminal 19, and cause them to be displayed on an external display device (not shown), such as a television receiver.

Moreover, the memory controller 14 supplies the image data written in the display-use area in the memory 16 to an image compressing/decompressing circuit 21 through an image bus 15, and, for example, causes the image data to be image-compressed into coded data in a predetermined format, such as a JPEG format and an MPEG format. This compressed coded data is temporarily memorized in a work-use area in the memory 16 through the image bus 15. Then, the memory controller 14 reads out the coded data written in the work-use area in the memory 16, and writes it in a removable memory medium 23, such as a semiconductor memory etc. through a microcomputer 22 (saving).

In the case of reproducing (displaying) the image data written in the memory medium 23, the memory controller 14 reads out the coded data saved in the memory medium 23 through the microcomputer 22, and causes it to be memorized temporarily in the work-use area in the memory 16. Then, the memory controller 14 supplies the coded data memorized in the work-use area in the memory 16 to the image compressing/decompressing circuit 21, causes the coded data to be decompressed to the original image data, and thereafter, and writes the image data in the display-use area in the memory 16. The image data written in the display-use area in the memory 16 is processed by the display-use signal processing circuit 17 as described in the above, and is displayed as a color image in the display panel 18, or is output as color video signals from an external output terminal 19.

The display panel 18 incudes, for example, a thin type display, such as an liquid crystal display (LCD) and an organic electro luminescence (EL) display, and displays a still image or a moving image written in the display-use area in the memory 16.

A synchronous signal generating circuit 24 generates a synchronous signal with a frequency having been matched with a predetermined display drive system, for example, such as a NTSC system and a PAL system, and supplies it to the image sensor 11, the camera signal processing circuit 13, the display-use signal processing circuit 17 and so on.

An operating section 31 includes various kinds of operation dials and operation buttons, such as a photographing operation mode dial that switches over photographing operation modes of moving image photographing and still image photographing, a release button that performs a shutter operation, an adjustment dial that adjusts the number of sheets to be continuously photographed for one second (hereinafter, referred to as a continuous-shooting speed), a shutter speed, and an aperture value, receives an operation of a user, and supplies the received operation information to a control section 32. In this connection, in the case where a touch panel is superimposed on the display panel 18, operation information designated by the touch panel is also supplied to the control section 32 from the operating section 31.

The control section 32 controls the operation of the whole camera 1 in response to operation setting information memorized in a nonvolatile memory 33 and a user's operation having been received by the operating section 31. In the operation setting information, the display drive system of the display panel 18, a continuous-shooting speed, etc. are included.

The nonvolatile memory 33 is a memory that can memorize also in a state where the power source of the camera 1 has been turned off, and memorizes the operation setting information that sets various kinds of operations of the camera 1, a program that controls the operations of the camera 1, and the like.

In the camera 1 constituted as described in the above, as the display drive system of the display panel 18, two kinds of drive systems of a NTSC system and a PAL system, are possible. The NTSC system is a drive system that displays 30 sheets of images for one second with a drive frequency of 60 Hz, and the PAL system is a drive system that displays 25 sheets of images for one second with a drive frequency of 50 Hz.

In the case of photographing or reproducing (displaying) a moving image, the control section 32 controls so as to perform photographing or reproducing (displaying) a moving image by a drive system in accordance with the display drive system memorized in the nonvolatile memory 33 as the operation setting information. The display drive system as the operation setting information can be changed by a setting operation of a user.

For example, in the case where the NTSC system is set as the display drive system of a moving image, the control section 32 causes the synchronous signal generating circuit 24 to generate a synchronous signal of 60 Hz and to supply it to the camera signal processing circuit 13, the display-use signal processing circuit 17, and the like.

On the other hand, in the case where the PAL system has been set as the display drive system of a moving image, the control section 32 causes the synchronous signal generating circuit 24 to generate a synchronous signal of 50 Hz and to supply it to the camera signal processing circuit 13, the display-use signal processing circuit 17, and the like.

Figure 2:
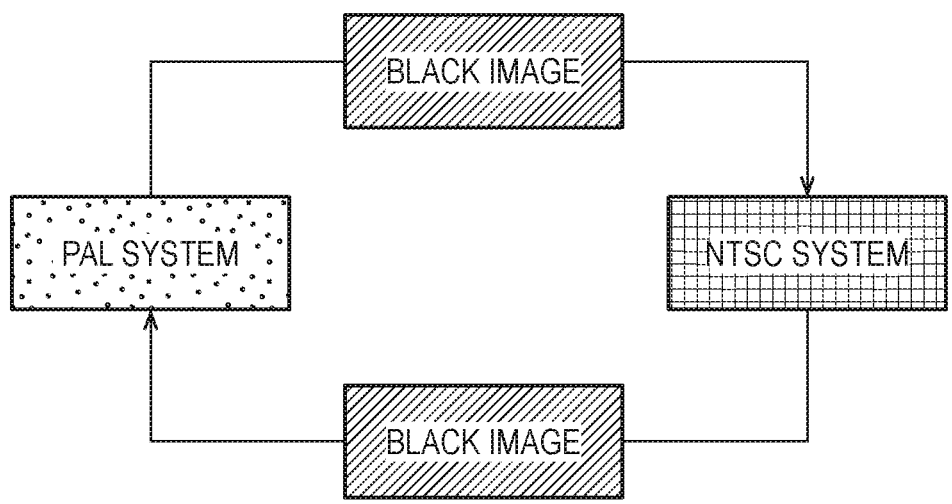
FIG. 2 is an illustration for describing occurrence of a black image due to the changing of a drive system.

In the case of changing the display drive system, since the drive frequency is changed, it is necessary to restart the display panel 18. Therefore, as shown in FIG. 2, in each of the case of changing from the PAL system to the NTSC system and the case of changing from the NTSC system to the PAL system, a period during which the screen of the display panel 18 cannot be renewed (for example, a state of a black image) occurs for a moment (about 0.5 seconds) (hereinafter, the state of the display panel 18 during this period is expressed as a black image).

Incidentally, as mentioned in the above, since the drive at the time of the continuous-shooting photography is dependent on the display drive system of a moving image, a continuous-shooting speed may lower by the display drive system.

In the case where the continuous-shooting speed is being set at 20 fps, if the display drive system is the NTSC system, since a continuous-shooting timing becomes a timing of an integral multiple of a display cycle, the camera can perform the continuous-shooting photography at 20 fps. However, in the case where the display drive system is the PAL system, a continuous-shooting speed lowers to 16.6 fps.

Then, even if the display drive system is any one of the NTSC system and the PAL system, the camera 1 is constituted so as to be able to perform the continuous-shooting photography without making the continuous-shooting speed lower from a set value (at the current case, 20 fps).

In concrete terms, in the case where a user designates the still image mode that performs the continuous-shooting photography as the photographing operation mode, the camera 1 sets the display drive system to a display drive system in which the current setting value of the continuous-shooting speed becomes a multiple of the display cycle, regardless of the display drive system being set in the operation setting information.

For example, in the case where the continuous-shooting speed is being set at 20 fps and the display drive system being set in the operation setting information is the PAL system, the display drive system is changed to the NTSC system, not the PAL system, so as to enable the continuous-shooting photography to be performed at the continuous-shooting speed of 20 fps.

However, in the case where the display drive system is changed from the PAL system being the display drive system being set in the operation setting information to the NTSC system, since a black image due to the changing of the display drive system occurs, the camera 1 performs the control so as to make the number of occurrences of the black image small as much as possible.

That is, the camera 1 to which the present technology has been applied, performs control aiming to enable the continuous-shooting photography to be performed without making the continuous-shooting speed lower from a set value (in the current case, 20 fps) and to make the number of occurrences of the black image small as much as possible.

In this connection, in the following description, in order to make the understanding easy, it is assumed that the display drive system memorized as the operation setting information in the nonvolatile memory 33 of the camera 1 is the PAL system and the continuous-shooting speed is being set at 20 fps. Although the continuous-shooting speed of 20 fps is the highest continuous-shooting speed possible in the camera 1, even in the case of an arbitrary continuous-shooting speed other than the highest continuous-shooting speed, it is similar.

Moreover, in the following description, in the case where the photographing operation mode has been set to the still image mode that photographs a still image, the description is given on the assumption that a continuous-shooting photography mode that performs the continuous-shooting photography with a set continuous-shooting sheet number, is supposed to be selected. In the still image mode, besides the continuous-shooting photography mode, for example, there is also a one-sheet photography mode that photographs one sheet of a still image.

2. CORRESPONDENCE RELATIONSHIP BETWEEN EACH SCREEN AND DISPLAY DRIVE SYSTEM

Figure 3:
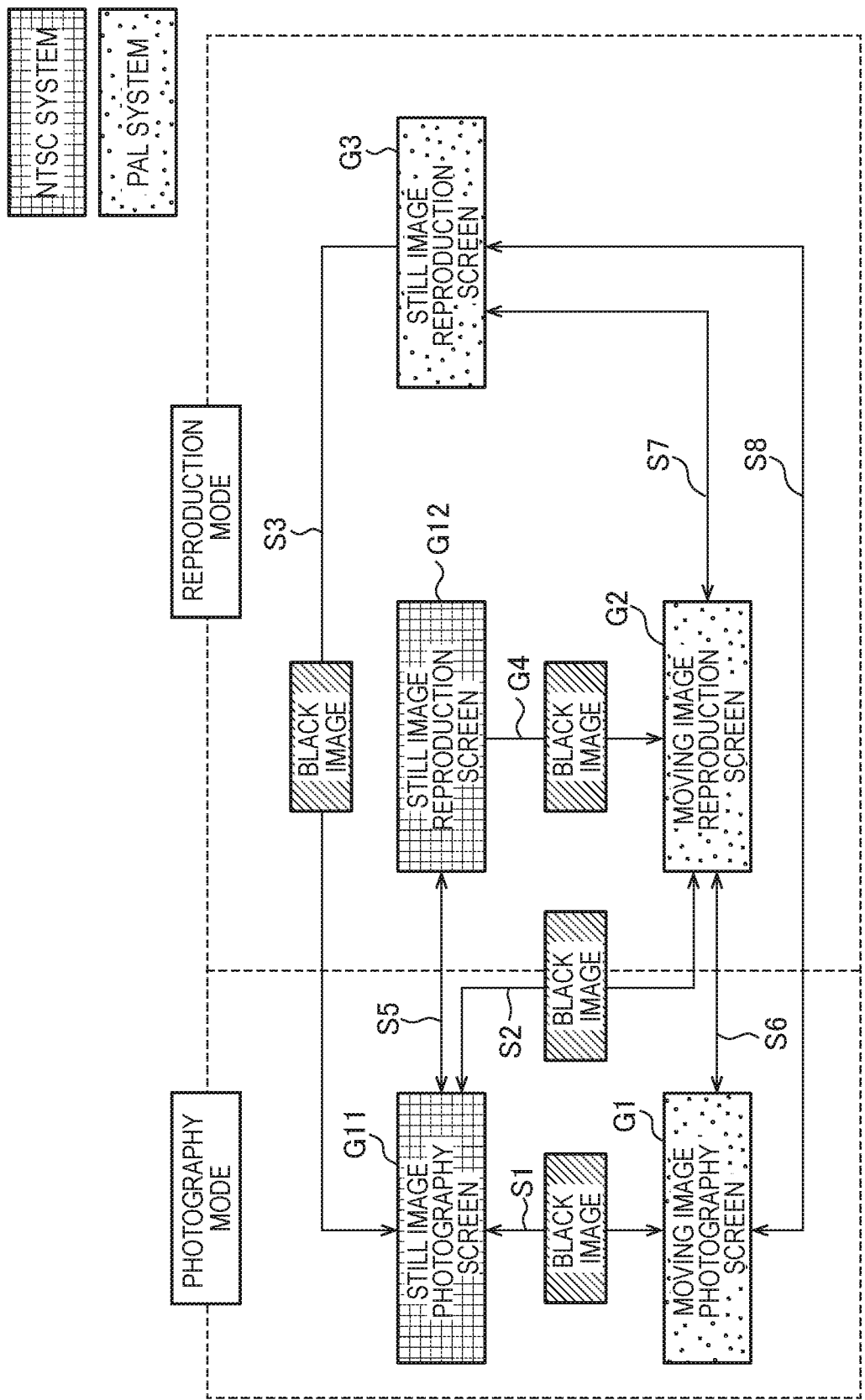
FIG. 3 is a diagram showing a correspondence relation between each screen and a display drive system in the case where a moving image is a PAL system.

FIG. 3 shows a correspondence relation between each screen displayed on the display panel 18 by the control of the control section 32 and the display drive system of such each screen.

The kinds of screens displayed on the display panel 18 include a moving image photography screen G1, a moving image reproduction screen G2, and a still image reproduction screen G3 that are driven by the PAL system, and further includes a still image photography screen G11 and a still image reproduction screen G12 that are driven by the NTSC system. The moving image photography screen G1 and the still image photography screen G11 are a screen displayed in the case where the state mode is the photography mode. On the other hand, the moving image reproduction screen G2, the still image reproduction screen G3, and the still image reproduction screen G12 are a screen displayed in the case where the state mode is the reproduction mode.

Since the display drive system memorized as the operation setting information is the PAL system, each of the moving image photography screen G1 at the time of photographing a moving image and the moving image reproduction screen G2 at the time of reproducing a photographed moving image is displayed by the PAL system. Therefore, in the screen transition S6 between the moving image photography screen G1 and the moving image reproduction screen G2, since there is no change in the display drive system, a black image does not occur.

On the other hand, at the time of photographing a still image by the continuous-shooting photography mode (photography mode), in the case where the display drive system is the PAL system, the continuous-shooting speed will lower to 16.6 fps as described in the above. Accordingly, in order to realize the continuous-shooting speed of 20 fps, the control section 32 changes the display drive system to the NTSC system. Therefore, the still image photography screen G11 at the time of photographing a still image by the continuous-shooting photography mode (photography mode) is displayed by the NTSC system.

Therefore, in the screen transition S1 between the moving image photography screen G1 and the still image photography screen G11, in the screen transition S2 between the moving image reproduction screen G2 and the still image photography screen G11, and the screen transition S3 from the still image reproduction screen G3 to the still image photography screen G11, the switching of the display drive system occurs, and a black image occurs. Moreover, also in the screen transition S4 from the still image reproduction screen G12 to the moving image reproduction screen G2, a black image occurs.

On the other hand, in the case of reproducing a photographed still image, since the display drive system of the display panel 18 is not related, the still image reproduction screen can be displayed without changing from the drive system before that. Therefore, in the screen transition S5 from the still image photography screen G11 of the continuous-shooting photography mode to the still image reproduction screen G12, a black image does not occur. Moreover, also, in the screen transition S7 from the moving image reproduction screen G2 to the still image reproduction screen G3 and in the screen transition S8 from the moving image photography screen G1 to the still image reproduction screen G3, a black image does not generate.

As described in the above, by controlling the display drive system of the screen, the control section 32 prevents a black image from occurring in "an operation that repeats photographing and reproducing of a still image", "an operation that repeats photographing and reproducing of a moving image", and "an operation that repeats reproducing of a moving image and reproducing of a still image" that are considered as an operation flow that a user uses frequently. As a result, in the camera 1, it is possible to reduce the number of occurrences of a black image as much as possible.

In this connection, the screen transition from the still image photography screen G11 to the still image reproduction screen G3 does not occur, because priority is given to the screen transition S5 from the still image photography screen G11 to the still image reproduction screen G12. Moreover, the screen transition from the moving image reproduction screen G2 to the still image reproduction screen G12 does not occur, because priority is given to the screen transition S7 from the moving image reproduction screen G2 to the still image reproduction screen G3.

3. DRIVE CONTROL PROCESSING FLOW AT TIME OF CHANGING TO CONTINUOUS-SHOOTING PHOTOGRAPHY MODE

Figure 4:
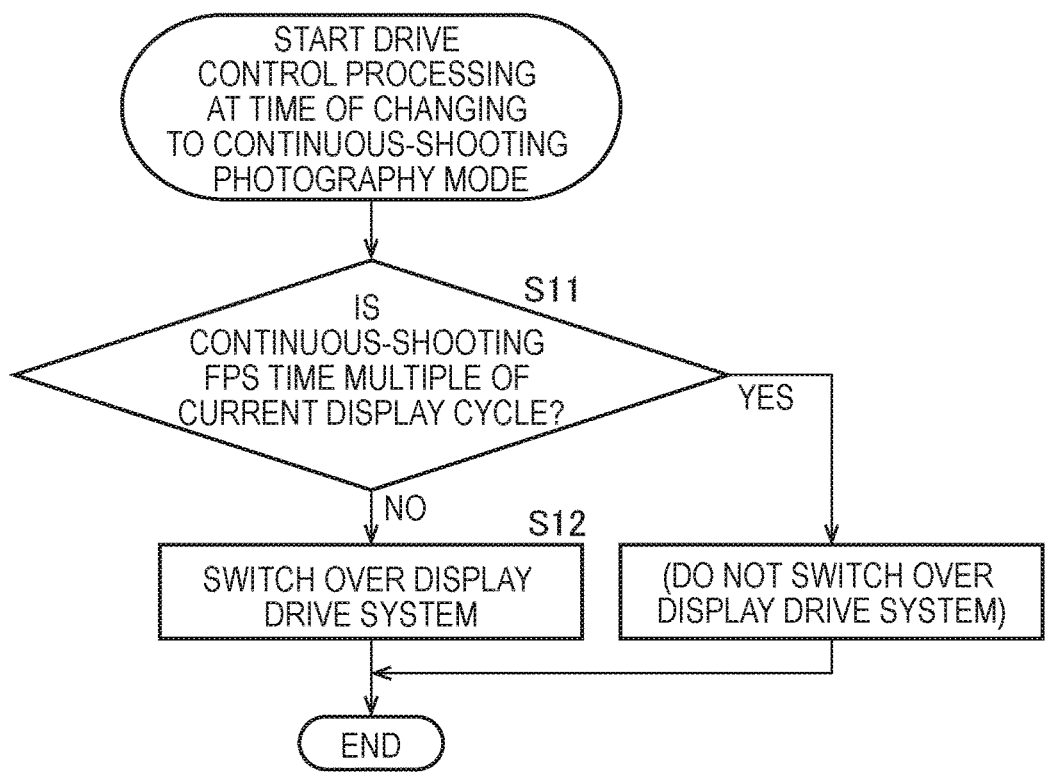
FIG. 4 is a flowchart for describing drive control processing at the time of changing to a continuous-shooting photography mode.

FIG. 4 is a flowchart showing drive control processing executed when an operation that changes the state mode from the reproduction mode to the continuous-shooting photography mode, has been performed.

Here, the case where the state mode is changed from the reproduction mode to the continuous-shooting photography mode is a case where the state mode has been changed from the reproduction mode to the photography mode and a case where the photographing operation mode is the still image mode and especially the continuous-shooting photography mode has been selected.

This processing is executed in the screen transition S3 from the still image reproduction screen G3 to the still image photography screen G11, the screen transition S5 from the still image reproduction screen G12 to the still image photography screen G11, and the screen transition S2 from the moving image reproduction screen G2 to the still image photography screen G11. In this connection, although not included in the changing from the reproduction mode to the continuous-shooting photography mode, this processing is executed also in the screen transition S1 from the moving image photography screen G1 to the still image photography screen G11 at the time of having changed the photographing operation mode from the moving image mode to the continuous-shooting photography mode.

When an operation in which the state mode is changed from the reproduction mode to the continuous-shooting photography mode, has been performed, in Step S11, the control section 32 determine whether a continuous-shooting fps Time being set has become a multiple of the current display cycle.

Here, the continuous-shooting fps time represents a photographing time (photographing cycle) for one sheet of a still image at the time of a predetermined continuous-shooting speed (fps). For example, in the case where the continuous-shooting speed is 20 fps, since the continuous-shooting photography is performed for 20 sheets in one second, a photographing time (continuous-shooting fps time) for one sheet of a still image is 1/20 seconds. For example, in the case where the display drive system of the display panel 18 is the PAL system and the continuous-shooting speed is 20 fps, the continuous-shooting fps time is not a multiple of the current display cycle (⅕₀ seconds). Moreover, for example, in the case where the display drive system of the display panel 18 is the NTSC system and the continuous-shooting speed is 20 fps, the continuous-shooting fps time is a multiple of the current display cycle (1/60 seconds).

In Step S11, in the case where it has been determined that the continuous-shooting fps time being set is not a multiple of the current display cycle, the processing proceeds to Step S12, and the control section 32 switches over the display drive system, and ends the processing. In the case where the display drive system is the PAL system and the continuous-shooting speed is 20 fps, the display drive system is switched over from the PAL system to the NTSC system.

On the other hand, in Step S11, in the case where it has been determined that the continuous-shooting fps time being set is a multiple of the current display cycle, the processing in Step S12 is skipped, and the processing is ended as it is. In this case, the display drive system is not switched over.

4. DRIVE CONTROL PROCESSING FLOW AT TIME OF CHANGING TO REPRODUCTION MODE

Figure 5:
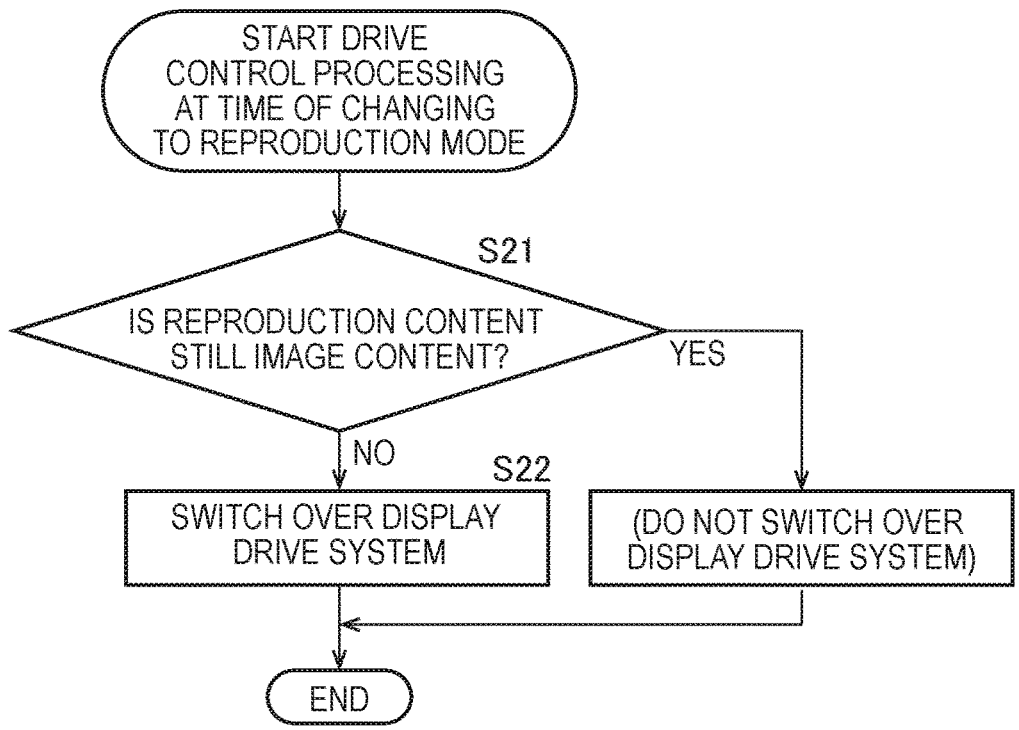
FIG. 5 is a flowchart for describing drive control processing at the time of changing to a reproduction mode.

FIG. 5 is a flowchart showing the drive control processing to be executed when an operation opposite to that in FIG. 4, i.e., an operation that changes the state mode from the continuous-shooting photography mode to the reproduction mode, has been performed.

This processing is executed in the screen transition S5 from the still image photography screen G11 to the still image reproduction screen G12 and the screen transition S2 from the still image photography screen G11 to the moving image reproduction screen G2.

When an operation that changes the state mode from the continuous-shooting photography mode to the reproduction mode, has been performed, in Step S21, the control section 32 determines whether a reproduction content being a content designated as a reproduction object is a still image content.

In Step S21, in the case where it has been determined that the reproduction content is not the still image content, i.e., a reproduction object content is a moving image content, the processing proceeds to Step S22, and the control section 32 switches over the display drive system, and ends the processing. The display drive system is switched over from the PAL system to the NTSC system.

On the other hand, in Step S21, in the case where it has been determined that the reproduction content is the still image content, the processing in Step S22 is skipped, and the processing is ended. In this case, the display drive system is not switched over.

5. DRIVE CONTROL PROCESSING FLOW AT TIME OF CHANGING CONTINUOUS-SHOOTING SPEED

Figure 6:
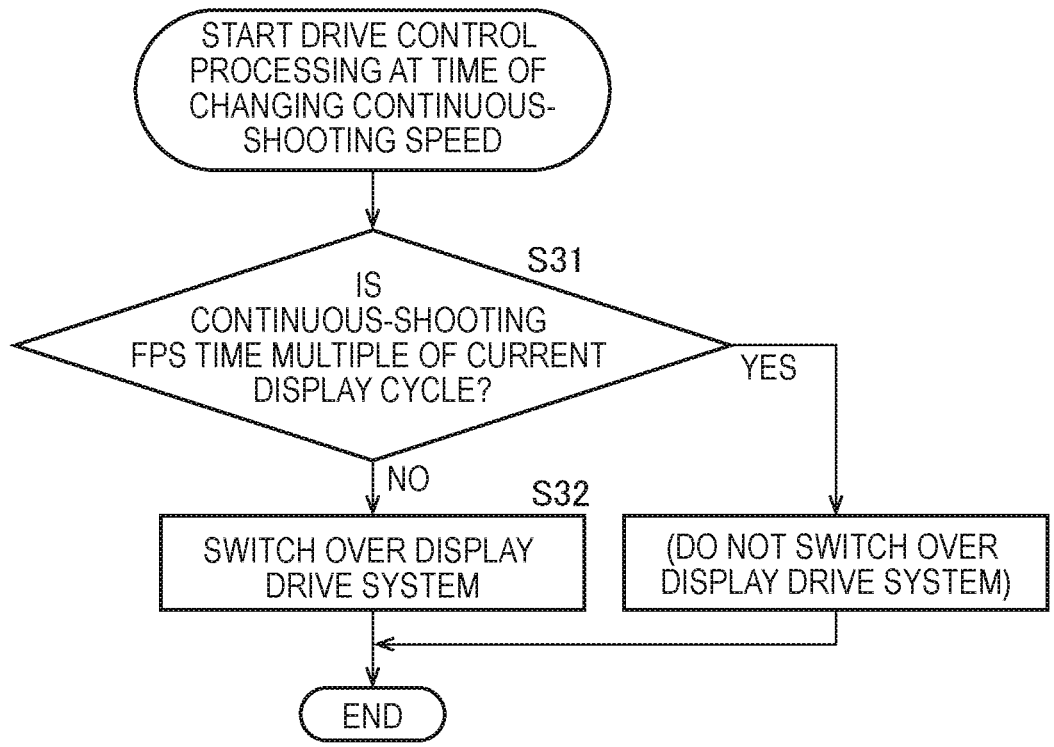
FIG. 6 is a flowchart for describing drive control processing at the time of changing a continuous-shooting speed.

FIG. 6 is a flowchart showing the drive control processing executed when an operation that changes a continuous-shooting speed in the continuous-shooting photography mode, has been performed.

When an operation that changes the continuous-shooting speed in the continuous-shooting photography mode, has been performed, in Step S31, the control section 32 determines whether the continuous-shooting fps time of the changed continuous-shooting speed has become a multiple of the current display cycle.

In Step S31, in the case where it has been determined that the continuous-shooting fps time is not a multiple of the current display cycle, the processing proceeds to Step S32, and the control section 32 switches over the display drive system, and ends the processing. For example, in the case where the current display drive system is the PAL system, the display drive system is switched over from the PAL system to the NTSC system.

On the other hand, in Step S31, in the case where it has been determined that the continuous-shooting fps time is a multiple of the current display cycle, the processing in Step S32 is skipped, and the processing is ended as it is. In this case, the display drive system is not switched over.

As described in the above, in the case where the continuous-shooting speed has been changed, it is determined whether the continuous-shooting fps time of the changed continuous-shooting speed has become a multiple of the current display cycle, and the display drive system is controlled.

6. DRIVE CONTROL PROCESSING FLOW AT TIME OF CONNECTING EXTERNAL DISPLAY DEVICE

Figure 7:
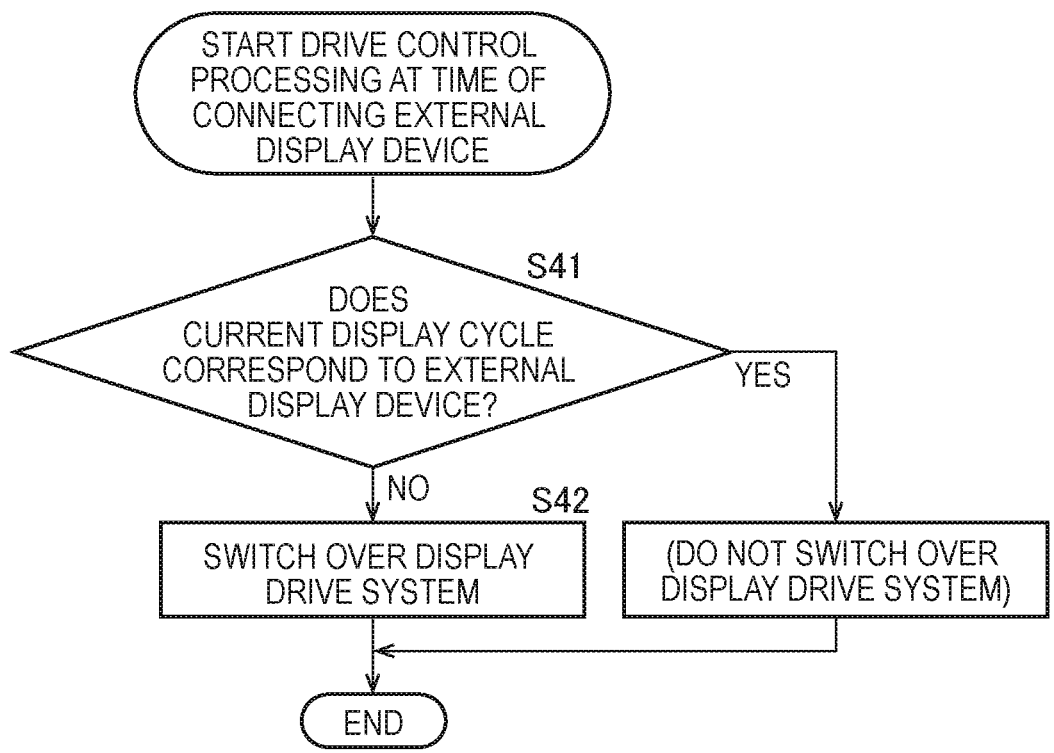
FIG. 7 is a flowchart for describing drive control processing of connecting an external display device.

FIG. 7 is a flowchart showing the drive control processing executed when an external display device is connected to the external output terminal 19.

When it has been detected that the external display device has been connected to the external output terminal 19, in Step S41, the control section 32 determines whether the current display cycle corresponds to the connected external display device, i.e., whether the current display drive system and the display drive system of the external display device coincide with each other.

In Step S41, in the case where it has been determined that the current display cycle does not correspond to the connected external display device, the processing proceeds to Step S42, and the control section 32 switches over the display drive system, and ends the processing. For example, in the case where the current display drive system is the PAL system and the display drive system of an external display device is the NTSC system, the display drive system is switched over from the PAL system to the NTSC system.

On the other hand, in Step S41, in the case where it has been determined that the current display cycle corresponds to the connected external display device, the processing in Step S42 is skipped, and the processing is ended as it is. In this case, the display drive system is not switched over.

In the drive control processing shown in FIG. 7, the display drive system is controlled to match the display drive system with the connected external display device. Therefore, depending on the display drive system of the external display device, there is a case where a multiple of the display cycle after the changing does not become the continuous-shooting fps time, and in this case, the continuous-shooting speed may become lower than the set value. Therefore, for example, the setting that gives the priority to that the continuous-shooting speed does not lower, is made possible by the operation setting information, and in the case where the setting has become effective, the control may be made not to match with the display drive system of the connected external display device.

7. CONCLUSION

As described in the above, at the time of photographing a still image with the continuous-shooting photography mode, the control section 32 performs control for switching over the drive frequency of the display panel 18 in response to the photographing cycle of a still image. In more concreter terms, depending on whether the continuous-shooting fps time is a multiple of the current display cycle of the display panel 18, the display drive system of the display panel 18 is switched over.

As described in the above, for example, in the case where the drive system at the time of photographing a moving image is the PAL system and the continuous-shooting speed has been set to 20 fps, since the continuous-shooting fps time (1/20 seconds) is not a multiple of the current display cycle (1/50 seconds), it is switched to the NTSC system in which the display drive system of the display panel 18 becomes a multiple.

Alternatively, for example, in the case where the drive system at the time of photographing a moving image is the NTSC system and the continuous-shooting speed has been set to 25 fps, since the continuous-shooting fps time (1/25 seconds) is not a multiple of the current display cycle (1/60 seconds), it is switched over to the PAL system in which the display drive system of the display panel 18 becomes a multiple.

Figure 8:
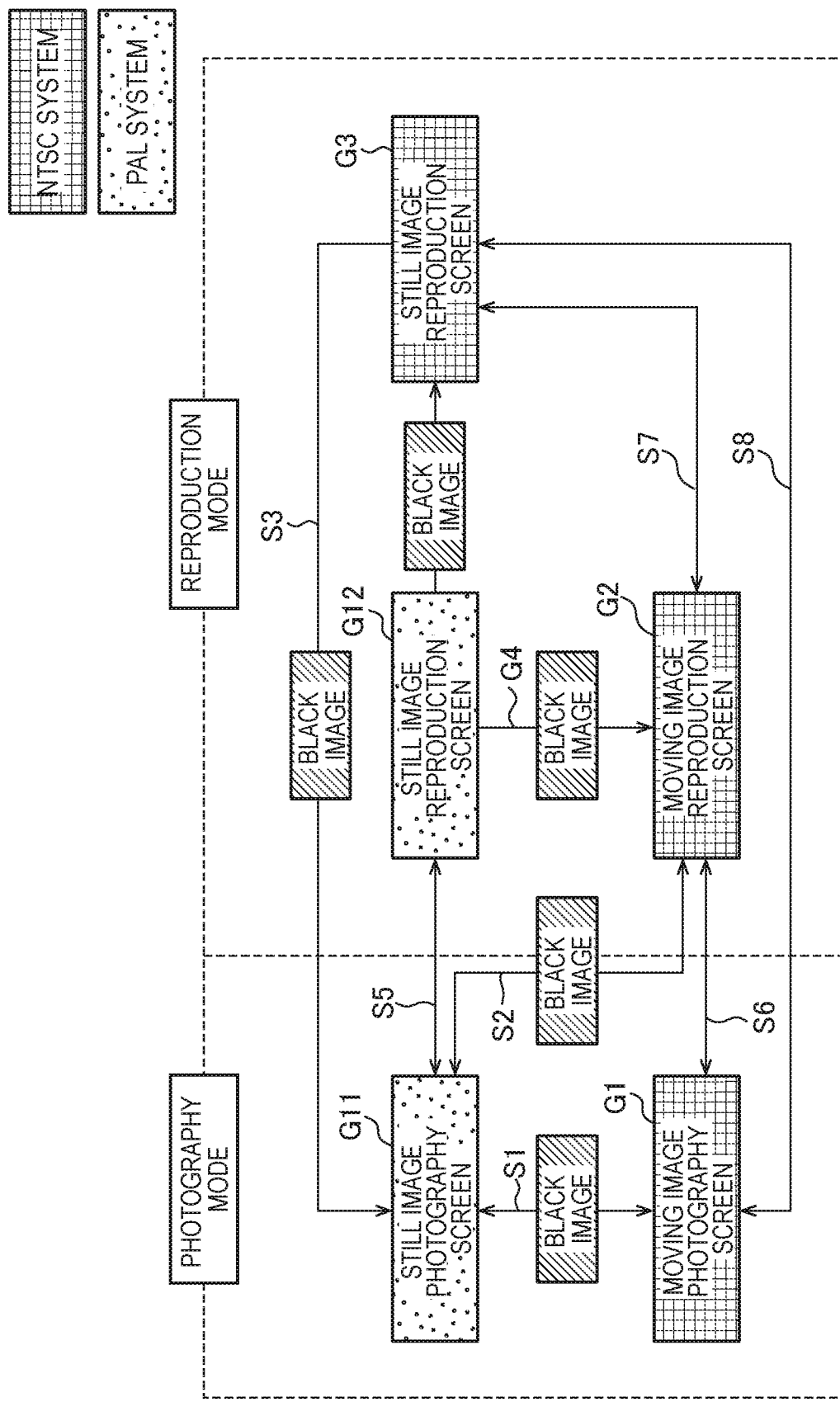
FIG. 8 is a diagram showing a correspondence relation between each screen and a display drive system in the case where a moving image is a NTSC system.

FIG. 8 shows a correspondence relationship between each screen displayed on the display panel 18 and the display drive system of such each screen in the case where the drive system at the time of photographing a moving image is the NTSC system and the continuous-shooting speed has been set to 25 fps.

FIG. 8 has a relationship in which the NTSC system drive and the PAL system drive are replaced with each other, relative to FIG. 3.

In this way, at the time of performing the continuous-shooting photography, by changing to the drive system in which the continuous-shooting fps time becomes a multiple of the current display cycle, it is possible to perform the continuous-shooting photography at a desired speed (highest continuous-shooting speed) regardless of the display drive system having been set in the operation setting information.

8. MODIFIED EXAMPLE

In the above-mentioned embodiment, the description has been given for an example of a case where, in the camera 1, as a drive system of the display panel 18, it is possible to set two kinds of the NTSC system with a drive frequency of 60 Hz and the PAL system with a drive frequency of 50 Hz.

However, the present technology is one that determines whether a continuous-shooting fps time corresponding to the set continuous-shooting speed is a multiple of a display cycle and switches over a drive frequency. Accordingly, the present technology is not limited only to the display drive systems of the NTSC system and the PAL system, and can be applied to, for example, an arbitrary drive frequency, such as 54 Hz.

Moreover, for example, the kind (number) of drive frequencies capable of being set in the display panel 18 may be made three or more kinds, not two kinds.

Moreover, in the above-mentioned embodiment, the control section 32 determines whether or not a continuous-shooting speed set by a user can be executed by the current drive frequency, by determining whether or not a continuous-shooting fps time corresponding to a continuous-shooting speed being set is a multiple of the current display cycle.

However, for example, as shown in FIG. 9, a continuous-shooting speed and a drive frequency capable of realizing the continuous-shooting speed may be memorized beforehand as a table, and then, by referring to the table, it may be made to determine whether or not a set continuous-shooting speed can be executed by the current drive frequency, and to switch it if needed.

In the table in FIG. 9, as a continuous-shooting speed capable of being set in the camera 1, there are 20 fps, 25 fps, 27 fps, and 30 fps, and the drive frequencies that make it possible to perform the continuous-shooting photography at the respective continuous-shooting speeds, are memorized by being associated with them. In the case where the continuous-shooting speed is 20 fps and 30 fps, the drive frequency is 60 Hz, in the case where the continuous-shooting speed is 25 fps, the drive frequency is 50 Hz, and in the case where the continuous-shooting speed is 27 fps, the drive frequency is 54 Hz.

Although FIG. 9 shows an example of a correspondence table between a continuous-shooting speed and the drive frequency of the display panel 18, it is sufficient if the table is one that shows a correspondence between the photographing cycle of an image and the display cycle of the display panel 18.

9. EXAMPLE OF COMPUTER

The present technology is not limited to the above-mentioned imaging device (including a digital video camera), and can be applied to an arbitrary image processing device including a display function that makes a display panel display, for example, a mobile terminal such as a smart phone etc., a mobile game machine, a tablet terminal, and an electronic device such as a portable music reproducing device.

A series of processes described above can be executed by hardware or software. When a series of processes is executed by software, a program constituting the software is installed in a computer. Here, examples of the computer include a microcomputer incorporated in dedicated hardware and a general-purpose personal computer which is capable of executing various kinds of functions when various kinds of programs are installed therein.

Figure 10:
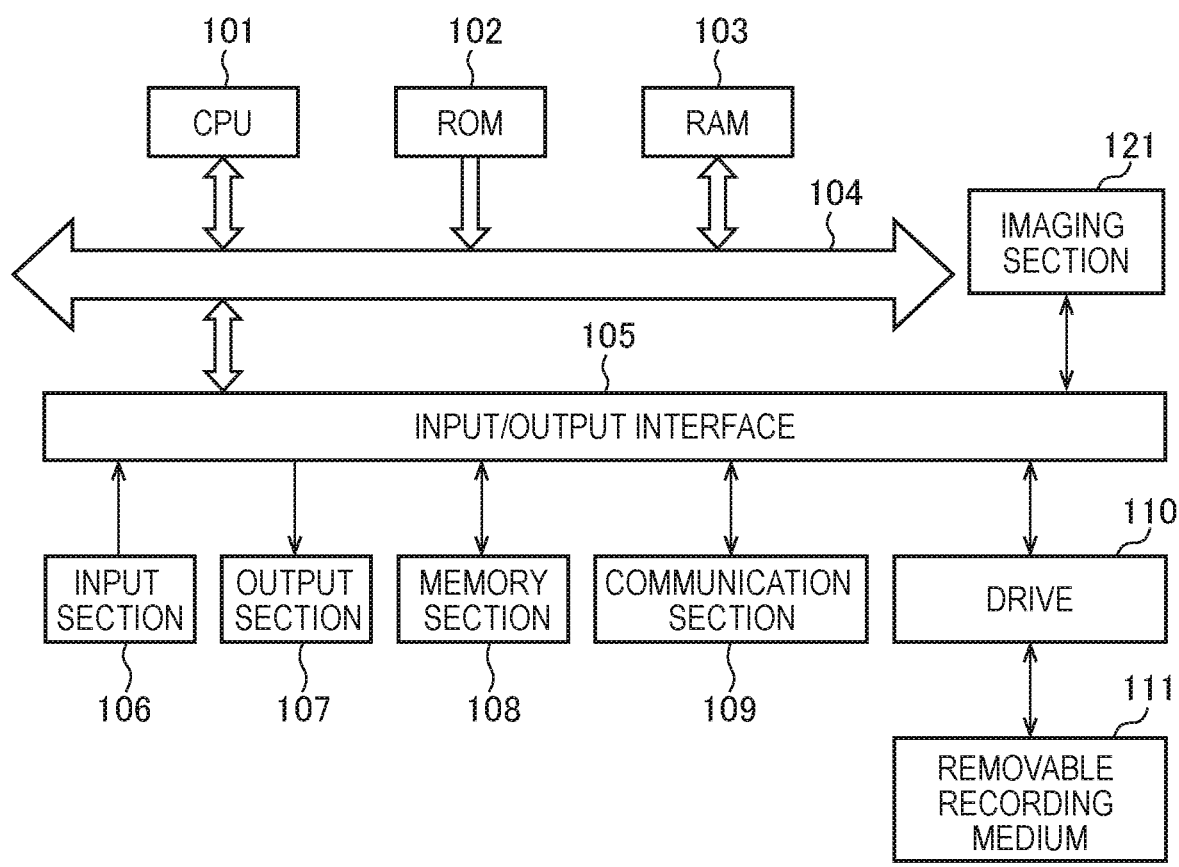
FIG. 10 is a block diagram showing a constitution example of one embodiment of a computer to which the present technology has been applied.

FIG. 10 is a block diagram illustrating an exemplary hardware configuration of a computer that executes a series of processing described above by a program.

In the computer, a central processing unit (CPU) 101, a read only memory (ROM) 102, and a random access memory (RAM) 103 are connected to one another by a bus 104.

An input/output interface 105 is further connected to the bus 104. An input section 106, an output section 107, a memory section 108, a communication section 109, and a drive 110 are connected to the input/output interface 105.

The input section 106 includes a keyboard, a mouse, a microphone, or the like. The output section 107 includes a display, a speaker, or the like. The memory section 108 includes a hard disk, a nonvolatile memory, or the like. The communication section 109 includes a network interface or the like. The drive 110 drives a removable recording medium 111 such as a magnetic disk, an optical disk, a magneto-optical disk, or a semiconductor memory.

The imaging section 121 includes an image sensor such as a charge coupled device (CCD) and a complementary metal oxide semiconductor (CMOS) sensor. The imaging section 121 images a photographic object, and supplies the image data of the imaged photographic object to the CPU 101 etc. through the input/output interface 105.

In the computer configured as described above, the CPU 101 loads a program that is stored, for example, in the memory section 108 onto the RAM 103 via the input/output interface 105 and the bus 104, and executes the program. Thus, the above-described series of processing is performed.

In the computer, by inserting the removable recording medium 111 into the drive 110, the program can be installed in the memory section 108 via the input/output interface 105. Further, the program can be received by the communication section 109 via a wired or wireless transmission medium such as local area network, the Internet, or digital satellite broadcasting and installed in the memory section 108. Moreover, the program can be installed in advance in the ROM 102 or the memory section 108.

It should be noted that the program executed by the computer may be a program that is processed in time series according to the sequence described in this specification or a program that is processed in parallel or at necessary timing such as upon calling.

The steps described herein in the flow charts may be naturally performed chronologically in the described order, but do not necessarily have to be processed chronologically. The steps described herein in the flow charts may be executed in parallel, or at necessary timing like when invoked or the like.

An embodiment of the present technology is not limited to the embodiments described above, and various changes and modifications may be made without departing from the scope of the technology.

For example, it is possible to employ a combination of all or part of the above-described multiple functions as appropriate.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes is included in one step, the plurality of processes included in this one step can be executed by one apparatus or by sharing a plurality of apparatuses.

Note that the effects described in the present specification are not limiting but are merely examples, and there may be additional effects other than the description in the present specification.

Additionally, the present technology may also be configured as below.

(1)
An image processing device, including:
a control section that performs control for switching over a drive frequency of a display panel in response to a photographing cycle of an image.

(2)
The image processing device according to (1), in which the control section switches over the drive frequency of the display panel in accordance with whether the photographing cycle of one sheet of the still image is a multiple of a current display cycle of the display panel.

(3)
The image processing device according to (1) or (2), in which the control section switches over the drive frequency of the display panel in accordance with a correspondence table between the photographing cycle of one sheet of the still image and a display cycle of the display panel.

(4)
The image processing device according to any of (1) to (3), in which the photographing cycle of one sheet of the still image is a cycle at a time of performing continuous-shooting photography of a still image.

(5)
The image processing device according to any of (1) to (4), in which as the drive frequency of the display panel, the control section switches over 60 Hz of an NTSC system and 50 Hz of a PAL system.

(6)
The image processing device according to any of (1) to (5), further including:
a photographing section that photographs a still image; and
the display panel,
in which, in a case of displaying a still image on the display panel, the control section does not switch over the drive frequency of the display panel.

(7)
The image processing device according to any of (1) to (6), further including:
a memory section that memorizes the photographing cycle of the image as operation setting information,
in which the control section performs control for switching over the drive frequency of the display panel in response to the photographing cycle of the image memorized as the operation setting information.

(8)
The image processing device according to any of (1) to (7), further including:
an operating section that receives a setting operation for the photographing cycle of the image by a user,
in which the control section performs control for switching over the drive frequency of the display panel in response to the photographing cycle of the image set by the user.

(9)
The image processing device according to any of (1) to (8), in which in a case of photographing a plurality of images with the photographing cycle, the control section performs control for switching over the drive frequency of the display panel.

(10)
The image processing device according to any of (1) to (9), in which in a case of having been changed from a reproduction mode to a photography mode, the control section performs control for switching over the drive frequency of the display panel in response to the photographing cycle of the image.

(11)
The image processing device according to any of (1) to (10), in which in a case of having been changed from a photography mode to a reproduction mode, and in a case where reproduction content is a still image, the control section does not switch over the drive frequency of the display panel.

(12)
The image processing device according to any of (1) to (11), in which in a case where it has been detected that an external display device has been connected, the control section further performs control for switching over the drive frequency of the display panel in response to a drive system of the external display device.

(13)
An image processing method, including:
a step of performing, by an image processing device, control for switching over a drive frequency of a display panel in response to a photographing cycle of an image.

(14)
A program for causing a computer to function as:
a control section that performs control for switching over a drive frequency of a display panel in response to a photographing cycle of an image.

REFERENCE SIGNS LIST 1 camera
11 image sensor
13 camera signal processing circuit
17 display-use signal processing circuit
18 display panel
24 synchronous signal generating circuit
31 operating section
32 control section
33 nonvolatile memory
101 CPU
102 ROM
103 RAM
106 input section
107 output section
108 memory section
109 communication section
110 drive
121 imaging section

The invention claimed is:

1. An image processing device, comprising:
first circuitry configured to switch over a drive frequency of a display panel based on a correspondence table between a photographing cycle of an image and a display cycle of the display panel.

2. The image processing device according to claim 1, wherein the first circuitry is further configured to switch over the drive frequency of the display panel based on the photographing cycle of the image which is a multiple of a current display cycle of the display panel.

3. The image processing device according to claim 1, wherein the photographing cycle of the image is a cycle at a time of execution of continuous-shooting photography of a still image.

4. The image processing device according to claim 1, wherein the first circuitry is further configured to switch over 60 Hz of an NTSC system and 50 Hz of a PAL system as the drive frequency of the display panel.

5. The image processing device according to claim 1, further comprising:
second circuitry configured to photograph a still image; and
the display panel,
wherein, based on a display of the still image on the display panel, the first circuitry is further configured to stop the switch over of the drive frequency of the display panel.

6. The image processing device according to claim 1, further comprising:
a memory configured to memorize the photographing cycle of the image as operation setting information,
wherein the first circuitry is further configured to switch over the drive frequency of the display panel based on the photographing cycle of the image memorized as the operation setting information.

7. The image processing device according to claim 1, wherein the first circuitry is further configured to:
control receipt of a setting operation for the photographing cycle of the image by a user; and
switch over the drive frequency of the display panel based on the photographing cycle of the image set by the user.

8. The image processing device according to claim 1, wherein the first circuitry is further configured to switch over the drive frequency of the display panel based on photographing of a plurality of images with the photographing cycle.

9. The image processing device according to claim 1, wherein when an operation mode is changed from a reproduction mode to a photography mode, the first circuitry is further configured to switch over the drive frequency of the display panel based on the photographing cycle of the image.

10. The image processing device according to claim 1, wherein based on change of a mode from a photography mode to a reproduction mode and based on a still image as reproduction content, the first circuitry is further configured to stop the switch over of the drive frequency of the display panel.

11. The image processing device according to claim 1, wherein based on a connection of an external display device, the first circuitry is further configured to switch over the drive frequency of the display panel based on a drive system of the external display device.

12. An image processing method, comprising:
switching over, by an image processing device, a drive frequency of a display panel based on a correspondence table between a photographing cycle of an image and a display cycle of the display panel.

13. A non-transitory computer-readable medium having stored thereon computer-executable instructions, that when executed by a processor, cause the processor to execute operations, the operations comprising:
switching over a drive frequency of a display panel based on a correspondence table between a photographing cycle of an image and a display cycle of the display panel.

14. An image processing device, comprising:
circuitry configured to:
switch over a drive frequency of a display panel based on a photographing cycle of an image; and
based on a connection of an external display device with the image processing device, switch over the drive frequency of the display panel based on a drive system of the connected external display device.

* * * * *